United States Patent [19]

Morellini

[11] Patent Number: 4,696,241
[45] Date of Patent: Sep. 29, 1987

[54] CANE BILLET PLANTER

[76] Inventor: Peter Morellini, P.O. Box 188, Ingham, Queensland, 4850, Australia

[21] Appl. No.: 830,524
[22] PCT Filed: Jun. 3, 1985
[86] PCT No.: PCT/AU85/00118
  § 371 Date: Feb. 3, 1986
  § 102(e) Date: Feb. 3, 1986
[87] PCT Pub. No.: WO85/05531
  PCT Pub. Date: Dec. 19, 1985

[30] Foreign Application Priority Data

Jun. 1, 1984 [AU] Australia ............... PG5349

[51] Int. Cl.$^4$ ............................................. A01C 11/00
[52] U.S. Cl. ....................................................... 111/3
[58] Field of Search ............... 111/2, 3, 34; 414/502, 414/528

[56] References Cited

U.S. PATENT DOCUMENTS

| | | | |
|---|---|---|---|
| 1,618,958 | 2/1927 | Kassebeer | 111/3 |
| 1,726,139 | 8/1929 | Blasco et al. | 111/3 |
| 1,764,159 | 6/1930 | Estevez | 111/3 |
| 2,840,269 | 6/1958 | Anderson | 111/3 |
| 3,286,858 | 11/1966 | Julien | 111/3 |
| 3,344,830 | 10/1967 | Longman | 111/3 |
| 3,348,714 | 10/1967 | Ash | 414/528 |
| 3,404,808 | 10/1968 | Boudreaux | 111/3 |
| 3,943,862 | 3/1976 | Populin | 111/3 |
| 3,963,138 | 6/1976 | Fowler | 111/2 |
| 4,005,805 | 2/1977 | Faxas | 111/2 |
| 4,204,491 | 5/1980 | Quick | 111/3 |

FOREIGN PATENT DOCUMENTS

| | | | |
|---|---|---|---|
| 259678 | 6/1965 | Australia | 111/3 |
| 45345 | 7/1976 | Australia | 111/3 |

Primary Examiner—James R. Feyrer
Attorney, Agent, or Firm—Wood, Dalton, Phillips, Mason & Rowe

[57] ABSTRACT

Apparatus for planting cane billets including a bin assembly for carrying cane billets to be planted, a rotor supported at one end of the bin assembly, the rotor having a plurality of vanes which gather billets from the top of the bin assembly and direct billets into grooves between the vanes for depositing into a hopper, the hopper having a pair of endless conveying chains at its lower end, the chains moving in opposite directions to convey billets to feed chutes for depositing in a planting furrow.

15 Claims, 9 Drawing Figures

CANE BILLET PLANTER

BACKGROUND OF THE INVENTION

1. Field of the Invention

This invention relates to improvements to agricultural implements and particularly to an improved planter for sugar cane billets.

2. Background Art

Cane billet planters which are presently on the market are not suitable for use in all conditions. Most of the planters employ flights or chains having prongs thereon to elevate the cane billets from the bottom of a trailed storage container or bin and deposit the billets into a discharge chute. A disadvantage of this arrangement is that damage and splitting of billets can occur as the flights or prongs move through the mass of cane billets in the storage bin. The resulting damage to the billets causes poor strike or germination rate. Another disadvantage of the known billet planters is that they are relatively bulky and trailed from a tractor or other prime mover in such a manner that relatively high strain is placed on the tractor linkage arms.

DISCLOSURE OF THE INVENTION

The present invention aims to overcome or alleviate at least some of the above disadvantages by providing an improved cane billet planting apparatus which will operate in a reliable and efficient manner to ensure that cane billets are handled without damage during conveyance from a bin assembly to a planting furrow. The present invention also aims to provide apparatus which employs improved furrow forming and closing implements.

With the above and other objects in view, this invention resides broadly in apparatus for planting cane billets including a frame assembly, a bin assembly supported on said frame assembly and adapted in use to hold cane billets to be planted, gathering means supported on said frame assembly and operative to gather billets from the respective upper-most levels thereof in said bin assembly and directing means for receiving billets from said gathering means and directing said billets to a planting furrow.

Preferably the gathering means is in the form of a rotor having a plurality of vanes which when the rotor is rotated engage the upper-most billets in the bin assembly. Preferably also the bin assembly may be raised to direct billets toward the gathering means. Preferably the directing means includes a hopper provided at its base with a pair of juxtaposed conveying chains or the like which receive billets and convey billets to opposite sides of the apparatus for planting in respective furrows.

BRIEF DESCRIPTION OF DRAWINGS

In order that the invention may be more readily understood and put into practical effect, reference will now be made to the accompanying drawings which illustrate preferred embodiments of the invention and wherein.

BEST MODE FOR CARRYING OUT THE INVENTION

Figure 1:
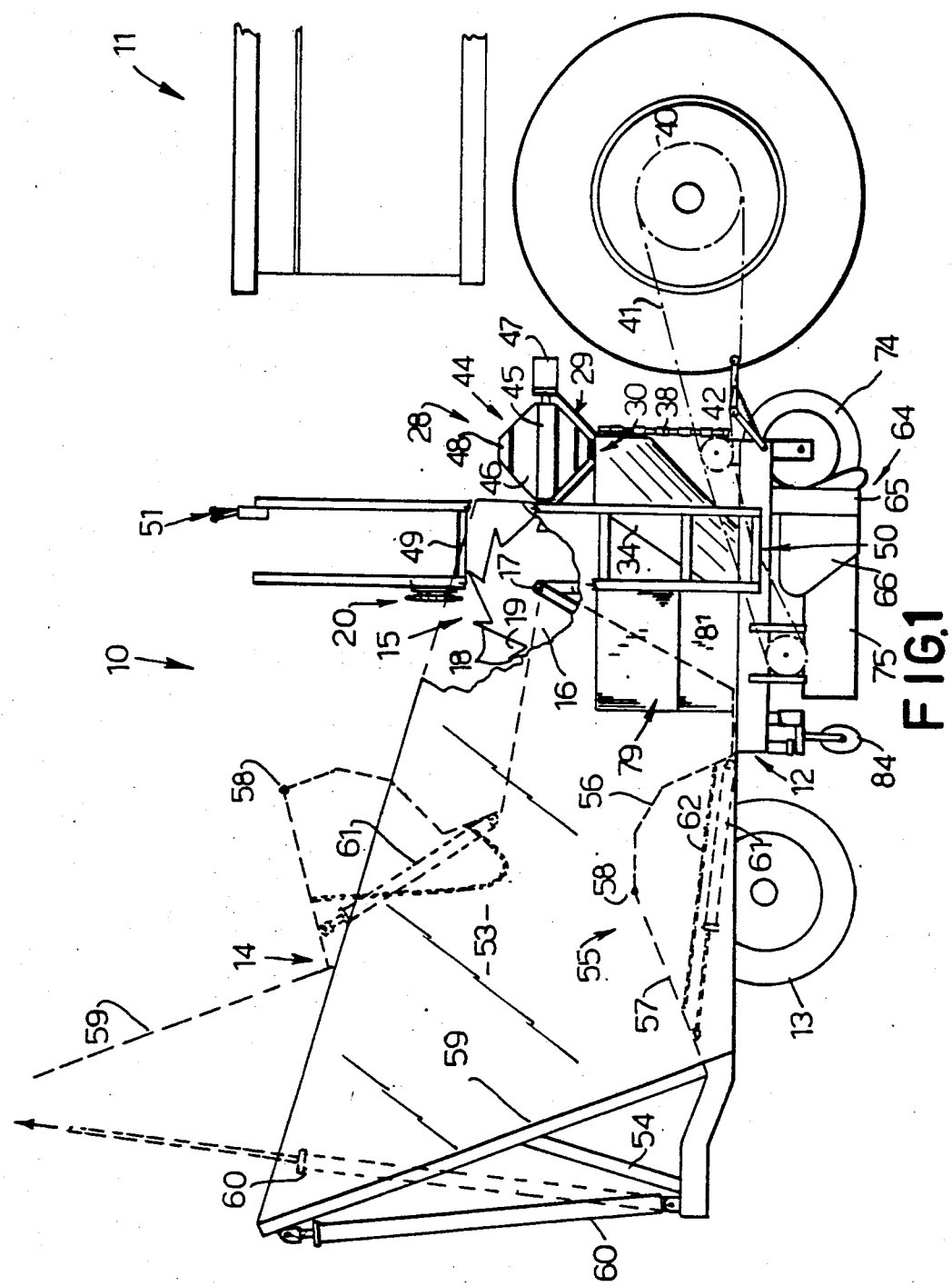
FIG. 1 is a side elevational partly cutaway view of the billet planter according to the present invention connected to a prime mover such as a tractor.
Figure 2:
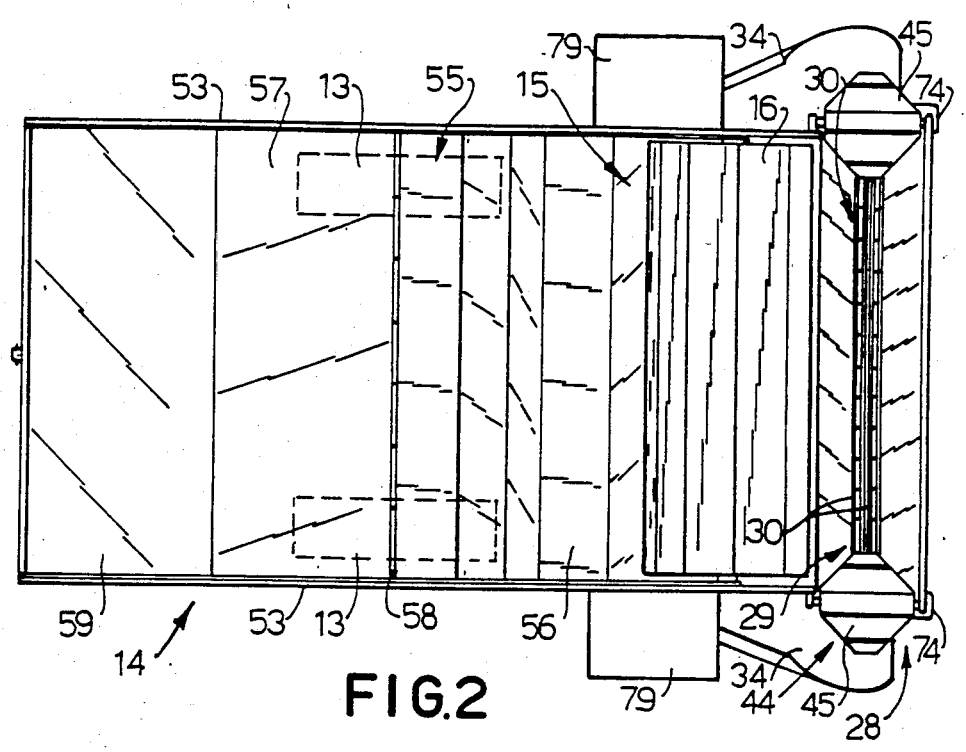
FIG. 2 is a partial plan view of the planter illustrated in FIG. 1.
Figure 9:
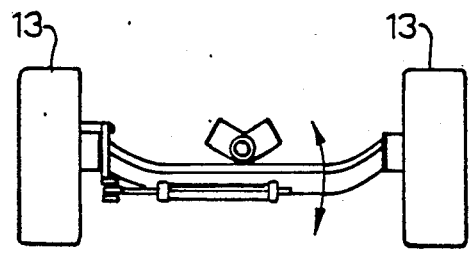
FIG. 9 illustrates in rear view a steerable wheel assembly of the planter.

Referring firstly to FIGS. 1 and 2, there is illustrated a billet planter 10 according to the present invention which is adapted to be linked at its forward end to a prime mover 11 such as a tractor or the like to be towed in use. In this embodiment, the planter 10 is preferably engaged with the lower linkages of the tractor three point linkage. The planter 10 includes a frame assembly 12 supported by a pair of freely rotatable wheels 13 which are preferably supported at the opposite ends of a transverse axle which as shown in FIG. 9 is mounted to the frame assembly 12 for pivotal movement about a longitudinally extending substantially horizontal axis so that the frame assembly of the billet planter will maintain a substantially horizontal attitude during movement over rough terrain.

Figure 3:
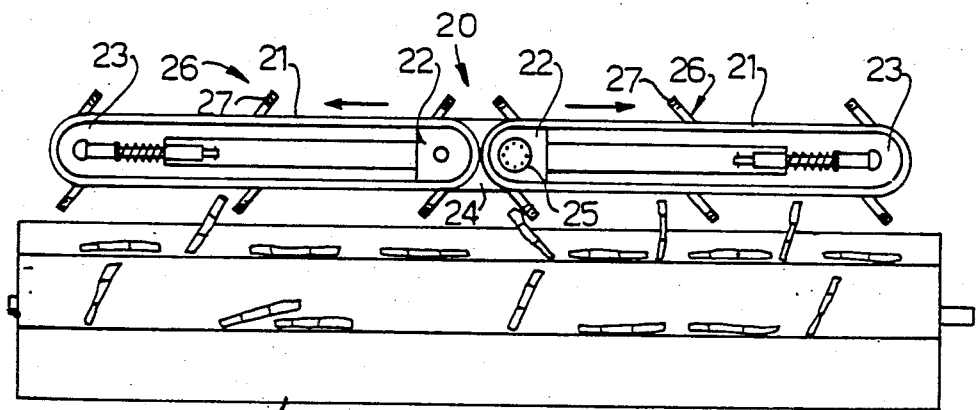
FIG. 3 illustrates a rear view of a billet wiper assembly associated with a feed drum.

Mounted on the frame assembly 12 is a billet bin assembly 14 and a cane feed assembly 15 which is adapted to convey billets from the top of the bin assembly 14 for planting into a furrow. The cane feed assembly 15 includes a transversely extending hollow feed drum 16 mounted on an axle 17 for rotation about a substantially horizontal and transverse axis adjacent the forward and upper end of the bin assembly 14. As shown, the drum 16 is provided on its outer surface with a plurality of vanes 18 arranged in a saw tooth like configuration to define a plurality of elongated grooves 19 extending longitudinally of the drum 16. When the drum 16 is rotated in use, the respective vanes 18 engage with billets located at the top of the load of billets in the bin assembly 14 so that a plurality of billets are gathered into the respective grooves 19 to lie substantially therealong. Some billets however do not lie along the grooves but tend to project outwardly therefrom in the manner shown in FIG. 3. So as to ensure that these projecting billets also adopt a substantially longitudinal attitude within the grooves 19, a pair of wiper assemblies 20 are supported above the drum 16.

As shown, each wiper assembly 20 includes an endless chain 21 supported about a driven sprocket 22 at its inner end and by a spring loaded sprocket 23 as its outer end. The driven sprockets 22 are linked by a gear box 24 and driven by an hydraulic motor 25 so that the chains 21 move in opposite directions. Supported on each chain 21 are a plurality of inclined wiping fingers 26 which preferably include a flexible end portion 27 to prevent damage to the cane billets and move inwardly towards the centre of planter 10 to engage with billets that may be projecting out of the grooves 19 to cause the billets to fall down into the grooves 19 to lie therealong. The wiping fingers 26 are arranged slightly above the outer periphery of the drum 16. Preferably the wiping assemblies 20 are mounted for vertical adjustable movement via a conventional slotted attachment to the frame 12 of the apparatus 10.

Figure 4:
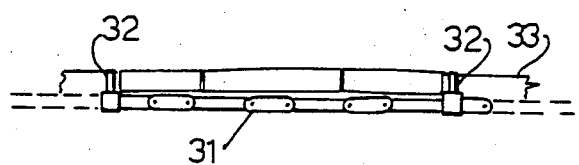
FIG. 4 illustrates the manner in which the cane billets are conveyed on the conveyor assembly to the feed chute.

Adjacent and forwardly of the drum 16 is a billet metering assembly 28 comprising a V-shaped elongated hopper 29 which is adapted to receive billets from the drum 16 and direct the billets downwardly to a pair of oppositely moving, substantially parallel feed chain assemblies 30. The chains 31 of each feed chain assembly 30 are provided with a plurality of spaced apart fingers or cleats 32 so that respective billets may be disposed therebetween in the manner illustrated in FIG. 4. Furthermore the respective chains 31 are spaced apart by a divider 33 which extends upwardly above the chains to a distance substantially the same as the upward projection of the fingers or cleats 32 so that fouling of billets carried by the respective chains 31 will not occur. The oppositely moving chains 31 are arranged to direct the billets toward both ends of the hopper 29 for depositing into respective chutes 34 for transfer into the planting furrows. Each feed chain 31 is adapted to be driven by a transmission assembly linked to the rear wheel of the prime mover. For this purpose, the respective opposite sprockets 35 of each feed chain are mounted on respective shafts 36 at opposite ends of the hopper 29 one sprocket 35 being fixed or keyed to the shaft 36 for rotational movement therewith, and the other sprocket 35 being freely rotatable on the shaft 36.

Figure 5:
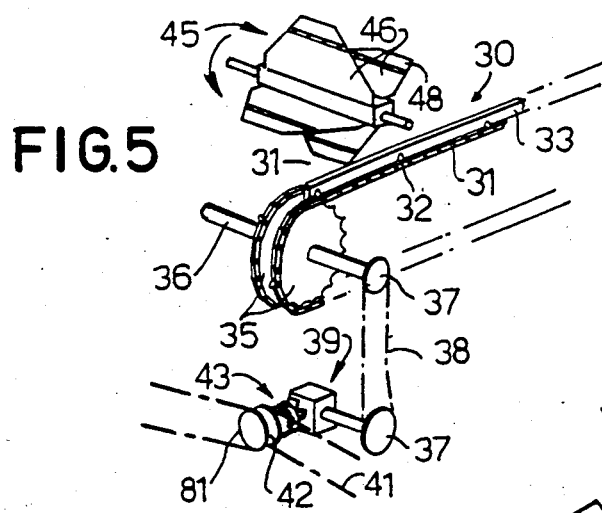
FIG. 5 is a perspective view showing details of a cane feed and metering assembly of the planter.

As shown more clearly in FIG. 5, each shaft 36 is linked through respective sprockets 37 and chain 38 to a right angled drive 39. The right angled drive 39 is arranged to be driven from a large sprocket 40 fixed to the rear wheel of the prime mover 11 via a chain 41, sprocket 42 and a selectively actuable dog clutch 43 which may be actuated by an hydraulic ram so that a drive force can be transmitted to the chain 31. A similar arrangement is provided on the other side of the planter 10 so that when the dog clutches 43 are engaged, movement of the prime mover will cause rotation of the sprockets 35 at either end of the hopper 29 and movement of the feed chains 31 in opposite directions.

Also located at each end of the V-shaped hopper 29 are a pair of rotatable metering assemblies 44 which in this instance are in the form of a paddle wheel 45 including four radially extending paddles 46. The paddle wheels 45 are supported for rotation about substantially horizontal axes and driven by an hydraulic motor 47 so that the paddle wheel 45 and paddles 46 will rotate in a direction opposite to the direction of movement of the billets toward the feed chute 34. Each paddle 46 is provided at its free end with a flexible portion 48 preferably formed of rubber material or the like which is so spaced from the chains 31 as to permit one or two billets to pass at any one time on the chain 31 to the feed chute 34 but which are adapted to prevent more than one or two billets at a time passing to the feed chute by throwing excess billets back into the hopper 29 to be received between a spare set of fingers or cleats 32 for individual carriage to the feed chutes 34. The rotational speed of the paddle wheels are preferably governed by flow control needle valves whilst a relief valve is also associated with each hydraulic motor 47 to relieve hydraulic pressure from the motors and to permit the paddle 45 to move slightly in the opposite direction to release billets which may become jambed between the paddles 45 and the chains 31.

The feed drum 16 is also adapted to be driven by a variable speed rotary hydraulic motor (not shown) controlled from the hydraulic controls located above the feed drum 16. For this purpose a walkway 49 is suppoted transversely of the planter 10 and forwardly of the wiper assemblies 20 with access being gained thereto by respective ladders 50 on opposite sides of the planter. The walkway floor is preferably formed of wire mesh so that an operator may observe billet feed and metering whilst having access to the hydraulic controls 51.

Figure 6:
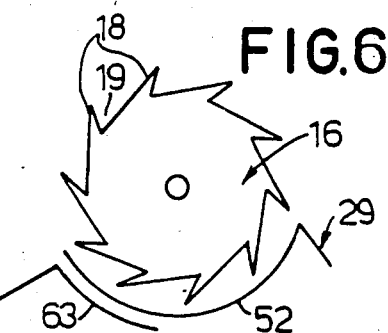
FIG. 6 is an end view of the rotatable feed drum and associated housing.

As shown more clearly in FIG. 6, the drum 16 is also partially located in a concentric trough 52 which is adapted to direct excess billets back into the bin assembly 14.

The bin assembly 14 includes a pair of fixed sides 53 mounted on the frame assembly 12 and braced at their rearward ends by braces 54. The bin assembly 14 includes a two-part floor 55, the forward part 56 of which is arranged for pivotal movement about the axis 17 of rotation of the drum 16 and the rearward part 57 of which is pivotally connected to the forward part by means of a transversely extending hinge 58. The rear part 57 also includes an upwardly extending back wall 59 and a ram assembly 60 extends between an upper portion of the back wall 59 and a rearwardly extending portion of the frame assembly 12. The forward and rear parts 56 and 57 are also connected by a further ram 61 and a pair of chains 62. A shaft and nut are associated with one end of each chain 62 so that the length thereof may be adjusted to a position where the chains are fully extended and under tension just prior to the maximum extension stroke of the ram 61. This ensures that the weight of the full bin assembly 14 is taken by the chains 62 rather than by the rams 61 when the rear ram 60 is lifting the bin assembly 14.

In use and as shown in dotted outline in FIG. 1, the ram 60 is initially actuated to raise the rear part 57 of the bin assembly 14 and consequently the forward part 56 due to the chain connection 62. When the rear ram 60 is extended to its maximum the bottom ram 61 is then actuated to pivot the forward and rear parts 56 and 57 of the bin floor 55 towards each other to thereby cause further upward pivotal movement of the forward part 56 of the bin assembly 14 to ensure maximum collection of billets from the bin assembly 14 by the drum 16. Preferably and as shown in FIGS. 1, 2 and 6 the forward part 56 of the bin floor 55 includes an arcuate portion 63 which is arranged in overlapping telescopic-like relationship with the trough 52 so that billets in say an overfull hopper 29 will be passed into the trough 52 and be directed back into the bin assembly 14 in the next cycle of the feed roller 16 irrespective of the position of the bin floor 55.

Figure 7:
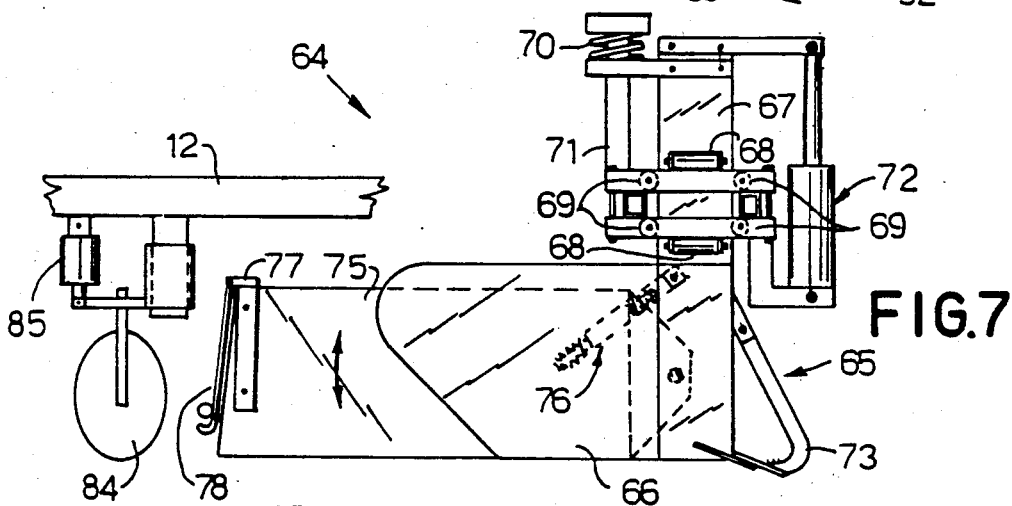
FIG. 7 illustrates a preferred form of furrow forming and closing assembly for use with the billet planting apparatus.

As illustrated in FIG. 7 the billet planter 10 also includes a pair of furrow forming and closing assemblies 64 each of which includes a stump jump tyne 65 having a pair of rearwardly extending mould boards 66. The tyne 65 is supported by a support portion 67 disposed in substantially upright attitude and supported for vertical sliding movement on the planter frame 12 by upper and lower guide rollers 68 which engage with opposite sides of the support portion 67 and front and rear rollers 69 which engage the front and rear edges of the support portion 67.

The tyne 65 is normally biased towards the ground preferably by a coil spring 70 engaged between the upper end of the support portion 67 and an upstanding member 71 secured to the planter frame 12. An hydraulic ram 72 is connected between the tyne support portion 67 and the frame 12 to raise the tyne support 67 and tyne 65 against the bias of the spring 70 to achieve a desired furrow forming depth, or alternatively, to raise the tyne 65 above the ground. Furthermore the control valve for the ram 72 may be placed in a "float" position to that the tyne 65 is biased downwardly to an operative position by the spring 70. If the curved forward section 73 of the tyne strikes an object of obstruction, the tyne 65 will rise up against the spring bias until the obstruction is passed. The depth of the tyne 65 may also be controlled by depth wheels 74 located on either side of the frame 12.

The feed chutes 34 are of open trough-like form and are adapted to direct billets downwardly to a central position in the furrow formed by the tynes 65. Disposed on either side of the chute are a pair of billet guides 75 which are inclined downwardly towards each other and pivotally mounted adjacent their forward ends between the mould boards 66. Spring biassing means 76 also extend between the guides 75 and tynes 65 so that the guides 75 are biased towards the ground but can move upwardly or downwardly to a limited extent to pass over obstructions or undulations such as gullies. The guides 75 are connected at their rear end by a brace 77 which pivotally supports a weighted cane leveller 78 which ensures that the billets locate within the furrows.

Figure 8:
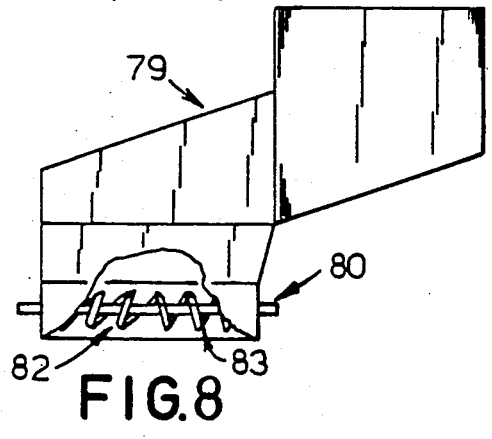
FIG. 8 illustrates a preferred fertilizer box configuration for the apparatus.

Disposed above the lower portion of each chute 34 are respective fertilizer boxes 79 which as more clearly seen in FIG. 8 are provided with an auger assembly 80 adjacent their lower ends. The auger assembly 80 is driven through a chain and sprockets 81 (FIG. 5) again from the rear wheel of the prime mover via the dog clutch 43 and comprises an auger formed in two parts 82 and 83 of opposite hand so that rotation of the auger will cause discharge of fertiliser to either side of the furrow and outwardly of the guides 75.

Mounted rearwardly of the feed chute 34 and guides 75 are respective furrow closing discs 84 which are supported from the planter frame 12 for-adjustable vertical movement under the control of an hydraulic ram 85 which may be controlled by a valve located with the other hydraulic controls 51.

The respective wheels 13 of the billet planter are longitudinally aligned with each tyne assembly 64 to ensure compaction of the ground about the billets after planting. The wheels 13 are also arranged to be steerable so as to alleviate most of the strain on the prime mover linkage arms during turning. For this purpose and as shown in FIG. 8, a hydraulic ram 84 is arranged to turn the wheels 13 which are linked by a suitable linkage, the ram 84 extending and retracting in response to the steering of the prime mover are also turned by a hydraulic steering ram, the ram 84 is connected hydraulically in parallel with the prime mover steering ram so that movement of the steering ram in one direction and consequent turning of the prime mover causes movement of the ram 84 and thus pivotal movement of the wheels 13 in the opposite direction.

Preferably the wheels 13 are spaced from the large driving tractor wheels, a distance similar to the distance between the front steerable wheels of the tractor and rear wheels so that pivotal steering movement of the tractor wheels will be accompanied by a corresponding angular movement of the planter wheels 13. Of course, this corresponding movement can be achieved by varying the connecting linkages or strokes of hydraulic rams.

In use it will be seen that as the prime mover 11 is driven forwardly a drive force will be transmitted from the tractor rear wheel sprocket 40 and via the actuated dog clutch 43 to the fertilizer augers 80 and the feed chains 31. Hydraulic fluid from the tractor hydraulics may then be directed to the hydraulic motors to drive the drum 16, paddle wheels 45 and wiper assemblies 20 under the control of the hydraulic control valves 51. Rotation of the rotor 16, which occurs at a relatively slow speed because of a step down gear box associated with its hydraulic drive motor, enables billets to be collected from the top of the bin assembly 14 and deposited into the hopper 29 where they are conveyed to the chutes 34 at the opposite sides of the planter whilst rotation of the paddle wheels 45 will ensure that jamming of billets does not occur. As the level of billets in the bin assembly 14 falls the floor of the bin assembly 14 is raised by extension of the hydraulic ram 60 so that continuous feed of billets to the rotor 16 is maintained.

To ensure that the billet bin 14 is substantially emptied the bottom ram 61 is then actuated to draw the forward and rear parts 56 and 57 of the bin floor towards each other which will cause further upright pivotal movement of the forward part 56 of the bin floor and direction of the billets therein towards drum 16. Of course, at this stage the tynes or drills 65 will be lowered into the ground to form the furrows into which the billets are deposited with the planting furrows being closed by the closing discs 84 and flattened down by the rear wheels 13 of the planter.

The above arrangement ensures that minimum damage occurs to the billets during conveyance from the bin assembly 14 to the furrows so that maximum strike rate is achieved. Furthermore the arrangement of the tyne assemblies 64 permits one or the other tyne 65 to be raised where for example planting up to a slanting headland is required.

A further advantage of the tyne assemblies 64 is that not only can each tyne 65 be moved separately but each tyne 65 also has a stump jump facility. The foldable floor of the bin assembly 14 also ensures that the center of gravity of the whole apparatus is maintained relatively low so that the planter maintains a high stability in use. The closure discs 84 are also adjustable so as to cater to variance in soil types. Furthermore the rams 85 which actuate the closure discs 84 are preferably associated with a flow restrictor so that they are the last rams to be actuated. Preferably also actuation of the rams is monitored by means of a visually detectable sensor such as a warning light located in the tractor cab so that the tractor operator can monitor the state of the system.

Of course the furrow forming and closing implements may be in many different forms other than those referred to above and also the planter may be trailed from the tractor moving in many different ways. It will also be realized that the apparatus may be used for single row planting rather than double row planting by merely stopping rotation of one of the feed chains 31. The feed chains 31 may also if desired be in the form of endless belts or equivalent mechanisms.

It will thus be understood that whilst the above has been given by way of illustrative example, various modifications and variations may be made to the above described embodiments by persons skilled in the art without departing from the broad scope and ambit of the invention as herein set forth and defined in the appended claims.

I claim:

1. Apparatus for planting elongate cane billets in planting furrows, said apparatus comprising a mobile frame assembly, an elongated hopper assembly on said frame assembly for receiving billets to be planted, a pair of conveyor means associated with said hopper assembly and arranged to receive billets therefrom, each said conveyor means including an endless chain having a run extending longitudinally of said hopper assembly, said chain runs being disposed adjacent, and extending substantially parallel to each other, a plurality of spaced apart billet engaging projections on each said chain, said projections extending upwardly from said chain runs and defining therebetween respective compartments for individual said billets, said billets when disposed in said compartments lying substantially parallel to said chain runs, and elongated divider between said chain runs and extending substantially parallel thereto, said divider extending upwardly to a height substantially the same as the height of said projections, drive means for said chains for driving the respective said runs of said chains in opposite directions so as to convey billets in said compartments to opposite sides of said apparatus, and means for receiving billets from said compartments and directing said billets into planting furrows.

2. Apparatus according to claim 1 wherein said hopper assembly includes a substantially V-sectioned hopper and wherein said chain runs are disposed in the base of said hopper.

3. Apparatus for planting elongate cane billets in planting furrows, said apparatus comprising a mobile frame assembly, a bin assembly on said frame assembly for holding cane billets to be planted, an elongate hopper assembly supported adjacent said bin assembly and extending transversely to the direction of movement of said apparatus, means for gathering billets from said bin assembly and transferring said billets into said hopper assembly, a pair of conveyor means associated with said hopper assembly and arranged to receive billets therefrom, each said conveyor means having a run extending longitudinally of said hopper assembly, the respective said runs of said conveyor means being disposed adjacent, and extending substantially parallel to each other, said conveyor means including a plurality of spaced apart billet engaging projections defining therebetween respective compartments for individual said billets, said billets when disposed in said compartments lying substantially parallel to said conveyor runs, drive means for said conveyor means for driving the respective said runs of said conveyor means in opposite directions so as to convey billets in said compartments to opposite sides of said apparatus, and chute means at said opposite sides of said apparatus for receiving billets from said conveyor means and directing said billets into planting furrows.

4. Apparatus according to claim 3 wherein said billet engaging projections extend upwardly from said runs and there being provided an elongate divider between said runs, said divider extending upwardly to substantially the same height of said projections.

5. Apparatus according to claim 3 wherein said gathering means comprises an elongate rotor extending generally parallel to said hopper assembly and disposed in an upper portion of said bin assembly, and drive means for said rotor for causing rotation thereof so that said rotor engages billets at upper levels in said bin assembly and transfers said billets into said hopper assembly.

6. Apparatus according to claim 5 wherein said rotor includes a plurality of longitudinally extending circumferentially spaced vanes defining respective billet receiving grooves therebetween.

7. Apparatus according to claim 6 and including wiper means disposed above said rotor and extending longitudinally thereof, said wiper means including a plurality of spaced apart wiping fingers and means for moving said fingers longitudinally of said rotor to engage billets carried by said rotor and cause said billets to lie longitudinally of said grooves.

8. Apparatus according to claim 3 wherein said hopper assembly includes a substantially V-sectioned hopper and wherein said conveyor runs extend along the base of said hopper.

9. Apparatus according to claim 3 and including a tyne assembly for forming said planting furrow, said tyne assembly including a tyne member and means for supporting said tyne member for adjustable vertical movement, and therebeing provided biasing means for biasing said tyne member towards the ground for formation of said furrow but permitting said tyne member to move upwardly upon striking an obstruction.

10. Apparatus according to claim 9 and including actuator means associated with said tyne member supporting means and selectively acutable to cause said tyne member to move upwardly against the bias of said biasing means.

11. Apparatus according to claim 9 and including furrow closing discs supported on said frame assembly rearwardly of said tyne assembly, said discs closing said planting furrow after the deposit of said billet therein.

12. Apparatus according to claim 9 and including a pair of said tyne assemblies disposed on opposite sides of said apparatus for forming a pair of planting furrows and wherein said chute means includes a pair of chutes disposed at the respective opposite sides of said apparatus for directing billets to said respective furrows.

13. Apparatus according to claim 3 wherein said bin assembly includes a pair of fixed side walls and a movable floor portion and means for elevating said floor portion to direct billets in said bin assembly towards said gathering means.

14. Apparatus according to claim 13 wherein said floor portion includes two pivotally interconnected parts and therebeing provided means associated with said parts to prevent said parts moving pivotally away from each other in a first direction and actuating means connected between said parts and being selectively actuable to pivot said parts towards each other in the opposite direction.

15. Apparatus according to claim 3 and including a pair of paddle wheels disposed at the respective opposite sides of said apparatus and adjacent said conveyor means, and drive means for rotatably driving said paddle wheels to cause said paddle wheels to displace excess billets from said compartments.

* * * * *